United States Patent [19]

Etcheverry

[11] 4,290,615
[45] Sep. 22, 1981

[54] BUTTERFLY VALVE

[75] Inventor: John P. Etcheverry, Sylmar, Calif.

[73] Assignee: International Telephone and Telegraph Corporation, New York, N.Y.

[21] Appl. No.: 103,499

[22] Filed: Dec. 14, 1979

[51] Int. Cl.³ .............................................. F16K 5/06
[52] U.S. Cl. .................................. 277/221; 251/306; 251/307
[58] Field of Search ................ 251/306, 307; 277/221, 277/222

[56] References Cited

U.S. PATENT DOCUMENTS 1,398,439 11/1921 McMaster .......................... 277/221
4,105,040 8/1978 Chester .............................. 251/306

Primary Examiner—Robert I. Smith
Attorney, Agent, or Firm—A.Donald Stolzy

[57] ABSTRACT

A butterfly valve having a split sealing ring in a groove in the interior of the passageway therethrough, the sealing ring having mating ends of a tongue and groove construction or the like.

4 Claims, 14 Drawing Figures

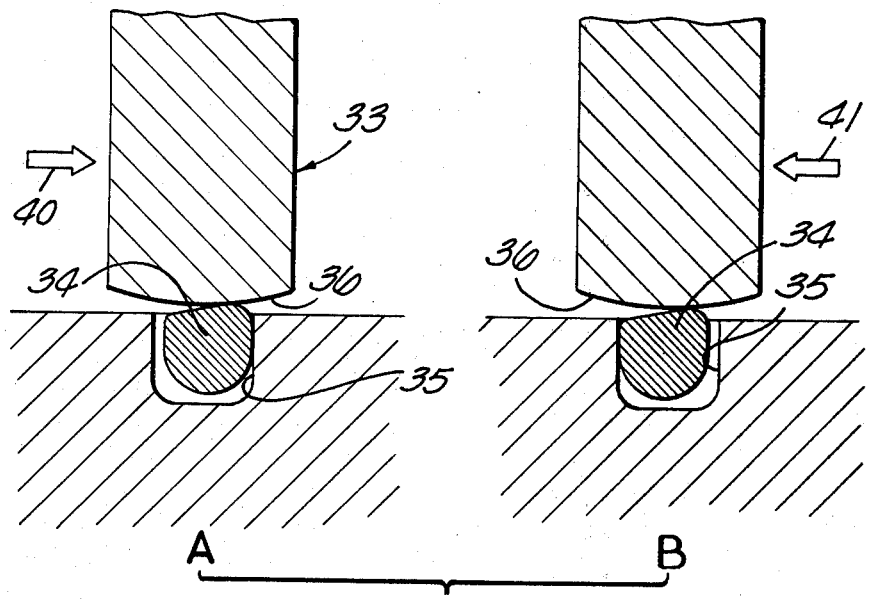
FIG. 8
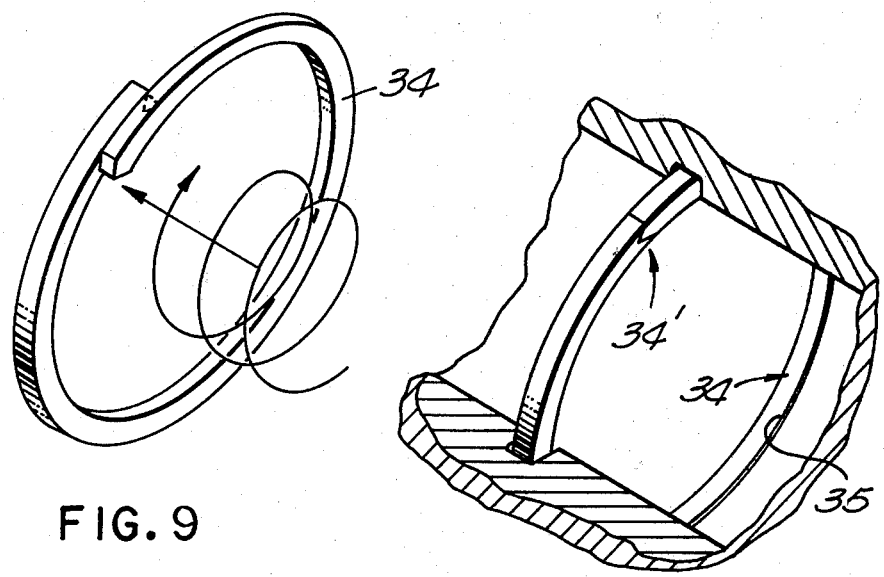
FIG. 9
FIG. 10

BUTTERFLY VALVE

BACKGROUND OF THE INVENTION

This invention relates to the art of fluid handling, and more particularly to a butterfly valve.

PRIOR ART STATEMENT

In the past, a sealing ring for a butterfly valve has been mounted on the valve itself. Typically, a prior art sealing ring has been mounted in a groove on the valve and pinned to the valve. Even though the prior art conduit, valve, sealing ring and pin are made of metal, the pin or ring frequently breaks. It is then carried downstream.

SUMMARY OF THE INVENTION

In accordance with the valve of the present invention, the above-described and other disadvantages of the prior art are overcome by providing a butterfly valve with a sealing ring which can be locked in position in the valve wall.

BRIEF DESCRIPTION OF THE DRAWINGS

In the accompanying drawings which illustrate exemplary embodiments of the present invention:

FIG. 8A is a transverse sectional view of a butterfly valve disc and sealing ring;

FIG. 8B is a view similar to that shown in FIG. 8A with fluid pressure being directed to the right rather than to the left side of the butterfly valve disc;

FIG. 9 is a perspective view of a sealing ring constructed in accordance with the present invention prior to its insertion in the wall of a butterfly valve;

FIG. 10 is a broken-away perspective view of the sealing ring shown in FIG. 9, but assembled in a butterfly valve.

DESCRIPTION OF THE PREFERRED EMBODIMENTS

Figure 1:
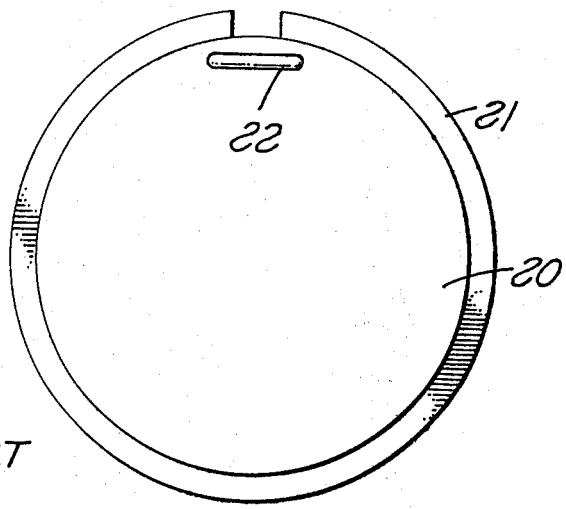
FIG. 1 is a front elevational view of a butterfly valve disc constructed in accordance with the prior art.
Figure 3:
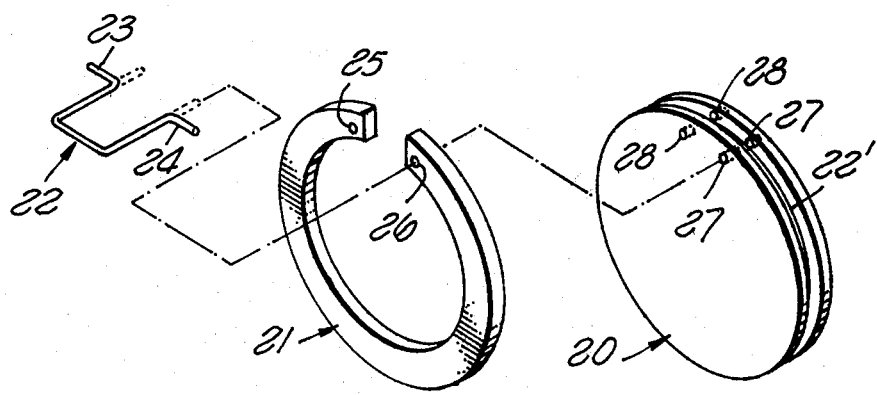
FIG. 3 is an exploded perspective of a pin, sealing ring and the disc of FIGS. 1 and 2.

A prior art butterfly valve disc is illustrated at 20 in FIG. 1 having a sealing ring 21 wrapped therearound in a groove 22' shown in FIG. 3. Ring 21 is held in place by a pin 22.

As shown in FIG. 3, before legs 23 and 24 of pin 22 are bent to the position shown in FIG. 3, ring 21 is wrapped around disc 20 in groove 22' so that holes 25 and 26 in ring 21 become aligned with holes 28 and 27, respectively, in disc 20.

Figure 2:
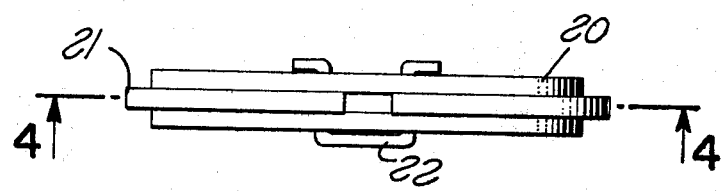
FIG. 2 is a top plan view of the disc shown in FIG. 1.

With pin 22 looking much like a staple, the legs thereof are then inserted in succession in holes 27, 26 and holes 28, 25. Pin 22 is then formed to the position shown in FIGS. 1, 2 and 3.

Figure 4:
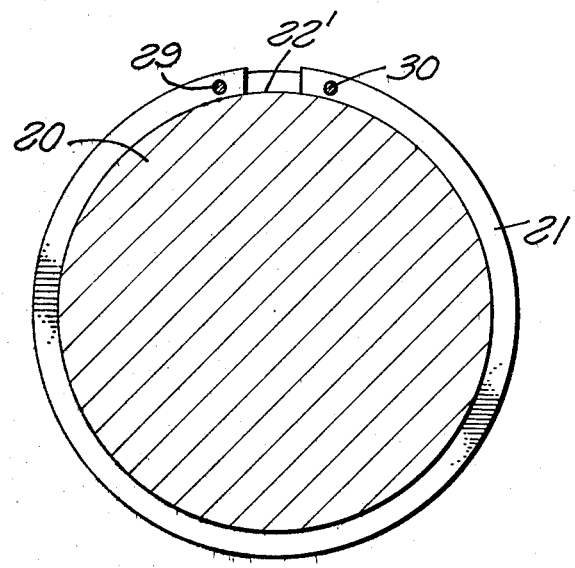
FIG. 4 is a vertical sectional view of the disc taken on the line 4—4 shown in FIG. 2.

As shown in FIG. 4, pin 22 has legs 29 and 30 that extend through ring holes 25 and 26, respectively. Valve disc 20 is also shown in FIG. 4.

As will be noted in the legends, FIGS. 1, 2, 3 and 4 disclose portions of a prior art butterfly valve disc.

Figure 5:
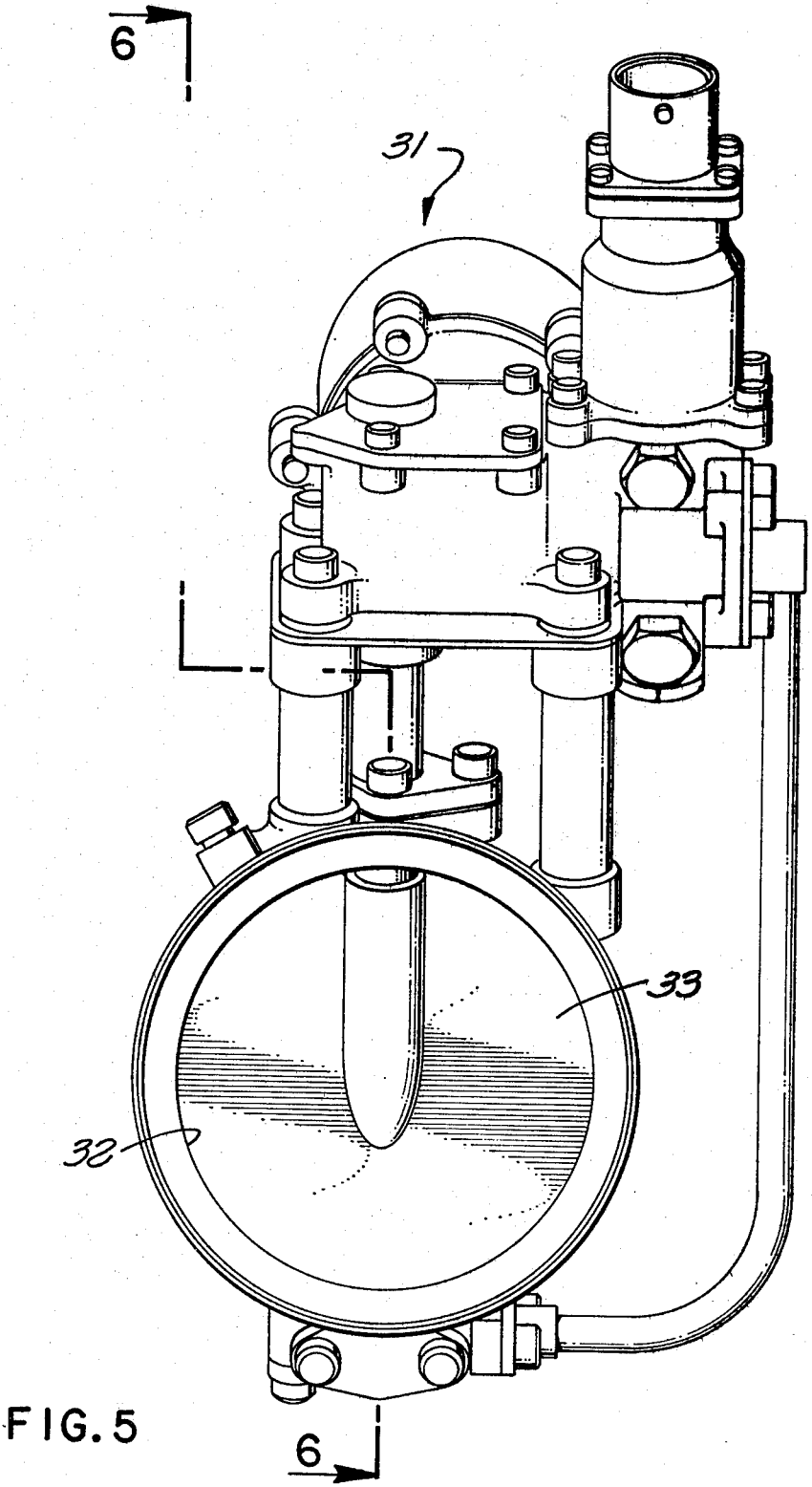
FIG. 5 is a perspective view, partly in elevation, of a butterfly valve constructed in accordance with the present invention.

The present invention, or one embodiment thereof, is shown in FIG. 5 including a butterfly valve thereon having an inlet passageway 32 and a butterfly valve disc 33. Valve 31 may be entirely conventional except for the seal thereof, the location of the seal, and the manner of operation of the seal.

Figure 6:
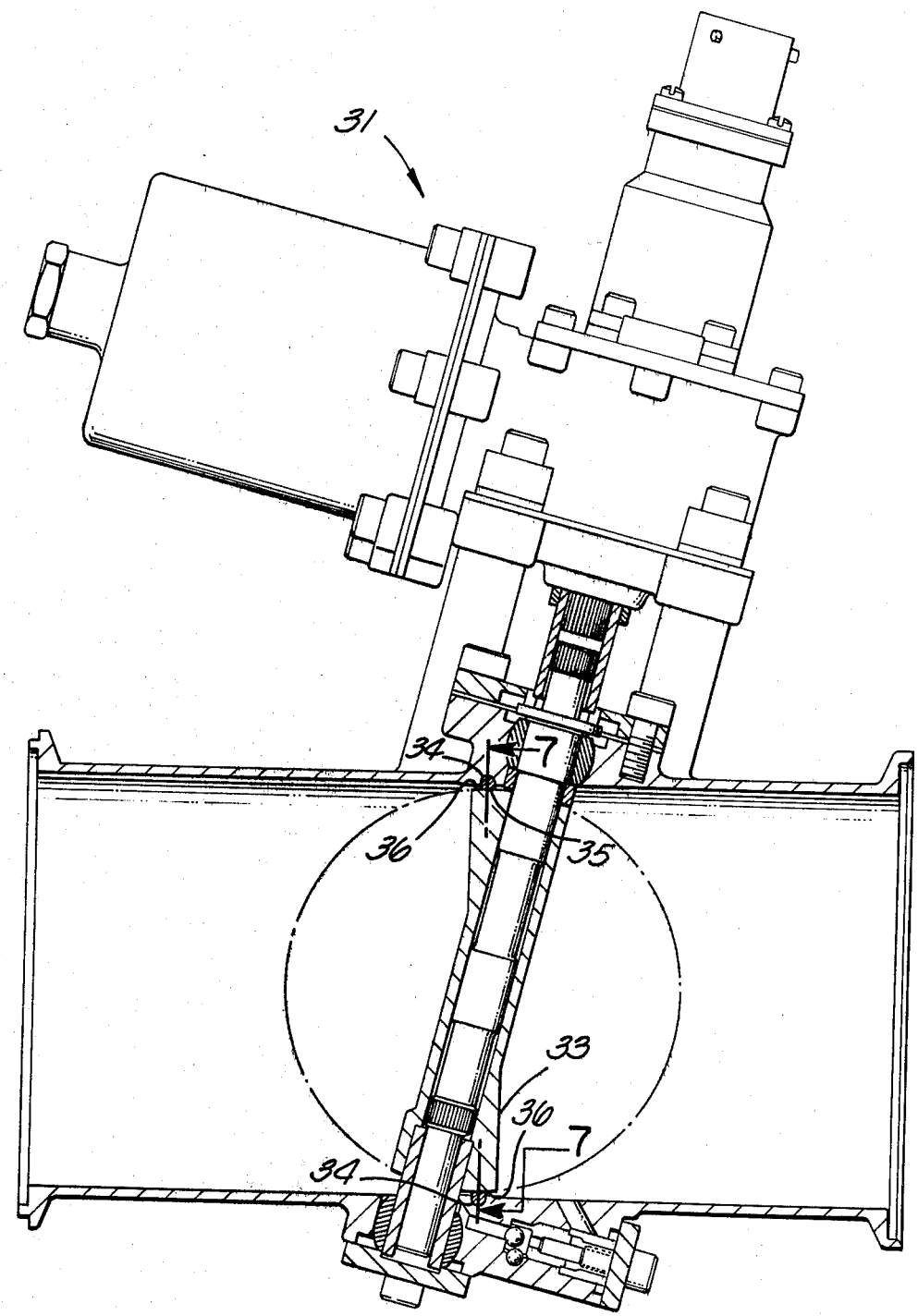
FIG. 6 is a vertical sectional view of the valve taken on the line 6—6 shown in FIG. 5.

The seal includes a ring 34 which is received in a groove 35 of passageway 32 as shown in FIG. 6.

Valve disc 33 is provided with an annular surface at 36 which is a portion of the surface of a sphere. Ring 34 bears against surface 36.

Figure 7:
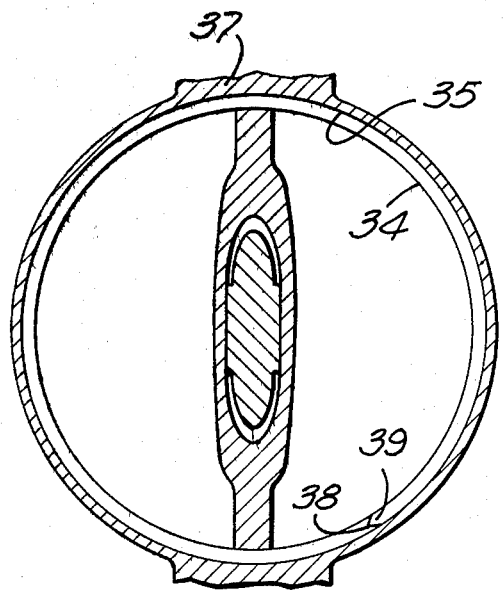
FIG. 7 is a broken-away vertical sectional view of the valve taken on the line 7—7 shown in FIG. 6.

Some of the foregoing may be better understood with reference to FIG. 7, which shows groove 35 with ring 34 therein. Note will be taken that ring 34 is split at 37. The split could be anywhere in the circumference. Ring 34 has a notch 38 to receive a projection 39. See FIG. 7.

Valve disc 33 may take a preponderance of pressure as indicated by an arrow 40 in FIG. 8A or by an arrow 41 shown in FIG. 8B.

Before ring 34 is assembled in groove 35, it would appear as shown in FIG. 9. Ring 34 is mounted in groove 35 by taking one end thereof and depressing the same into groove 35 at distances further and further apart from the said one end until the ring is positioned as shown in FIG. 10.

When the ends of ring 34 mate, as shown at 34' in FIG. 10, ring 34 is kept in a position in groove 35 such that the same cannot be removed from groove 35 without great difficulty. Special tooling and provision for removal in the body are required to remove the ring. Tolerances are rather small. Further, there is an effect at 34' similar to column loading. Thus, the sealing ring of the present invention does not break, nor is it carried downstream as in the case of prior art seals.

Figure 11:
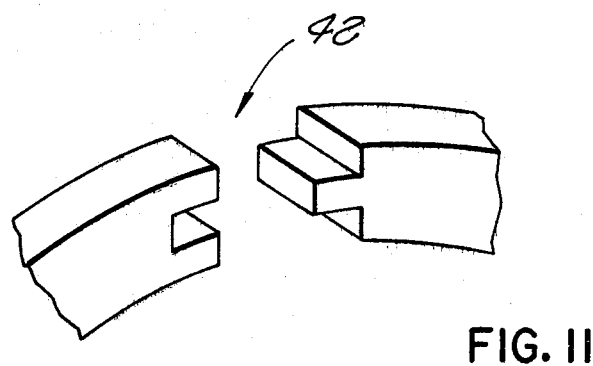
FIGS. 11, 12 and 13 are perspective views of alternative sealing rings of the present invention.
Figure 12:
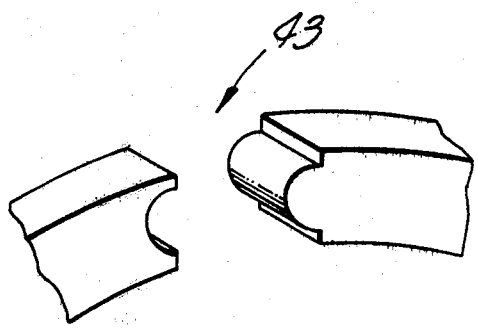
Figure 13:
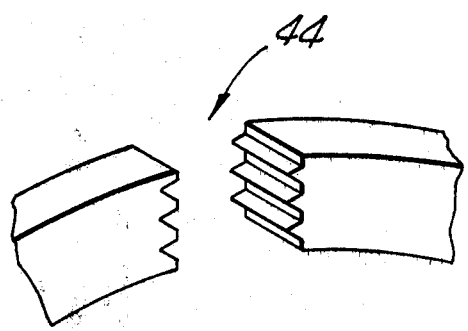

Alternative embodiments of the sealing ring of the present invention are shown at 42, 43 and 44 in FIGS. 11, 12 and 13, respectively.

What is claimed is:

1. A valve comprising: a hollow cylindrical conduit having an axis; pivot means extending through said conduit and through the axis thereof; a butterfly valve including a disc fixed to said pivot means in a manner to rotate therewith, said butterfly valve disc having a peripheral surface of revolution about said axis when said butterfly valve is closed, said conduit having a cylindrical groove therein symmetrical with said surface of revolution when said butterfly valve is closed; and a ring of rectangular cross section in said groove to seal against said surface of revolution, said groove having annular side walls, said ring being split at one point around its periphery and having mating ends at said point, one of said ends having a notch, the other of said ends having a projection to fit in said notch, said notch being V-shaped and being defined between two flat surfaces lying in planes normal to said side walls and inclined relative to each other at a predetermined angle, said two flat inclined planes intersecting in a line normal to said side walls, said projection having two surfaces inclined at said predetermined angle to form a wedge shaped body having an edge in a line normal to said side walls to fit contiguous to the bottom of said notch.

2. The invention as defined in claim 1, wherein said surface of revolution is a portion of a sphere.

3. A valve comprising: a hollow cylindrical conduit having an axis; pivot means extending through said conduit and through the axis thereof; a butterfly valve including a disc fixed to said pivot means in a manner to rotate therewith, said butterfly valve disc having a peripheral surface of revolution about said axis when said butterfly valve is closed, said conduit having a cylindrical groove therein symmetrical with said surface of revolution when said butterfly valve is closed; and a ring of rectangular cross section in said groove to seal against said surface of revolution, said groove having annular sidewalls, said ring being split at one point around its periphery and having mating ends at said point, one of said ends having a notch with a surface approximately normal to said side walls, the other of said ends having a projection to fit in said notch, said projection being shaped in the manner of a tongue of a tongue-and-groove connection, said tongue having a cross section uniform in a direction normal to said side walls.

4. The invention as defined in claim 3, wherein said surface of revolution is a portion of a sphere.

* * * * *